US006956907B2

United States Patent
Ketchum

(12) United States Patent
(10) Patent No.: US 6,956,907 B2
(45) Date of Patent: Oct. 18, 2005

(54) METHOD AND APPARATUS FOR DETERMINING POWER ALLOCATION IN A MIMO COMMUNICATION SYSTEM

(75) Inventor: John W. Ketchum, Harvard, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 722 days.

(21) Appl. No.: 09/978,337

(22) Filed: Oct. 15, 2001

(65) Prior Publication Data

US 2003/0072379 A1 Apr. 17, 2003

(51) Int. Cl.[7] .................................................. H04B 7/02
(52) U.S. Cl. .................................................. 375/267
(58) Field of Search .............................. 375/260, 267, 375/299, 347, 349; 370/203, 208, 242, 243

(56) References Cited

U.S. PATENT DOCUMENTS

| | | | | |
|---|---|---|---|---|
| 6,144,711 | A | 11/2000 | Raleigh et al. | 375/347 |
| 6,795,424 | B1 * | 9/2004 | Kapoor et al. | 370/343 |
| 2004/0042556 | A1 * | 3/2004 | Medvedev et al. | 375/260 |

FOREIGN PATENT DOCUMENTS

WO 9809395 3/1998

OTHER PUBLICATIONS

Robert Gallager "Information Theory and Reliable Communication" John Wiley and Sons, Inc. (1968).
Simon Haykin "Adaptive Filter Theory" Information and System Sciences Series. Prentice–Hall Inc., Englewood Cliffs, New Jersey, second edition (1991).
William H. Press, Saul A. Teukolsky, William T. Vetterling and Brian B. Flannery Numerical Recipes in C. Cambridge University Press, second edition (1992).

* cited by examiner

Primary Examiner—Don N. Vo
(74) Attorney, Agent, or Firm—Dmitry Milikovsky; Micky Minhas; Philip Wadsworth

(57) ABSTRACT

In a communication system (100) with limited power for each antenna, a method, apparatus and a processor (420) provide for determining bin energy level allocation to each OFDM frequency bin at each transmit antenna. An estimate of a solution vector including elements of the allocation bin energy level to each OFDM frequency bin at each antenna is determined. An error function based on the determined solution vector is also determined. An error magnitude is determined based on the determined error function. The error magnitude is compared to an error threshold. The processor (420) accepts the estimate of the solution vector with the elements of the allocation bin energy level when the error magnitude is less than the error threshold.

23 Claims, 4 Drawing Sheets

US 6,956,907 B2

METHOD AND APPARATUS FOR DETERMINING POWER ALLOCATION IN A MIMO COMMUNICATION SYSTEM

FIELD

The present invention relates generally to data communication, and more specifically to a novel and improved method and apparatus for determining allocation of bin energy at each antenna in a multiple-input multiple-output (MIMO) communication system.

BACKGROUND

A multi-channel communication system provides increased transmission capacity over other types of communication systems for various types of communication such as voice and data. Such a multi-channel system may be a multiple-input multiple-output (MIMO) communication system, an orthogonal frequency division modulation (OFDM) system, a MIMO system that utilizes OFDM, or some other type of system. A MIMO system incorporates multiple transmit antennas and multiple receive antennas to exploit spatial diversity. Spatial diversity may be used to support a number of spatial subchannels, each of which may be used to transmit data. An OFDM system effectively partitions the operating frequency band into a number of frequency subchannels (or frequency bins), each of which is associated with a respective subcarrier on which data may be modulated. A multi-channel communication system thus supports a number of "transmission" channels, each of which may correspond to a spatial subchannel in a MIMO system, a frequency subchannel in an OFDM system, or a spatial subchannel of a frequency subchannel in a MIMO system that utilizes OFDM.

The transmission channels of a multi-channel communication system typically experience different link conditions (e.g., due to different fading and multipath effects) and may achieve different signal-to-noise-plus-interference ratios (SNRs). Consequently, the transmission capacities (i.e., the information bit rates) that may be supported by the transmission channels for a particular level of performance may be different from channel to channel. As such, determining the power level allocation to each channel may be difficult. Adjusting power allocated to one channel may cause interference for another channel. Moreover, the link conditions typically vary over time. Therefore, in a time varying system, the determination of power allocation is increasingly difficult in a multi-channel communication system.

To this end as well as others, there is a need for techniques to effectively and efficiently determine power allocation to each channel in a multi-channel communication system.

SUMMARY

In a MIMO communication system with limited power for each transmit antenna, a method, apparatus, and a processor provide for determining bin energy level allocation to each OFDM frequency bin at each transmit antenna. An estimate of a solution vector including elements of the allocation bin energy level to each OFDM frequency bin at each antenna is determined. An error function based on the determined solution vector is also determined. An error magnitude is determined based on the determined error function. The error magnitude is compared to an error threshold. The processor accepts the estimate of the solution vector with the elements of the allocation bin energy level when the error magnitude is less than the error threshold.

BRIEF DESCRIPTION OF THE DRAWINGS

The features, nature, and advantages of the present invention are more apparent from the detailed description set forth below when taken in conjunction with the drawings in which like reference characters identify correspondingly throughout and wherein.

DETAILED DESCRIPTION

Various aspects, embodiments, and features of the invention may be applied to any multi-channel communication system in which multiple transmission channels are available for data transmission. Such multi-channel communication systems include multiple-input multiple-output (MIMO) systems, orthogonal frequency division modulation (OFDM) systems, MIMO systems that utilize OFDM, and others. The multi-channel communication systems may also implement code division multiple access (CDMA), time division multiple access (TDMA), frequency division multiple access (FDMA), or some other multiple access techniques. Multiple access communication systems can support concurrent communication with a number of terminals (i.e., users).

Figure 1:
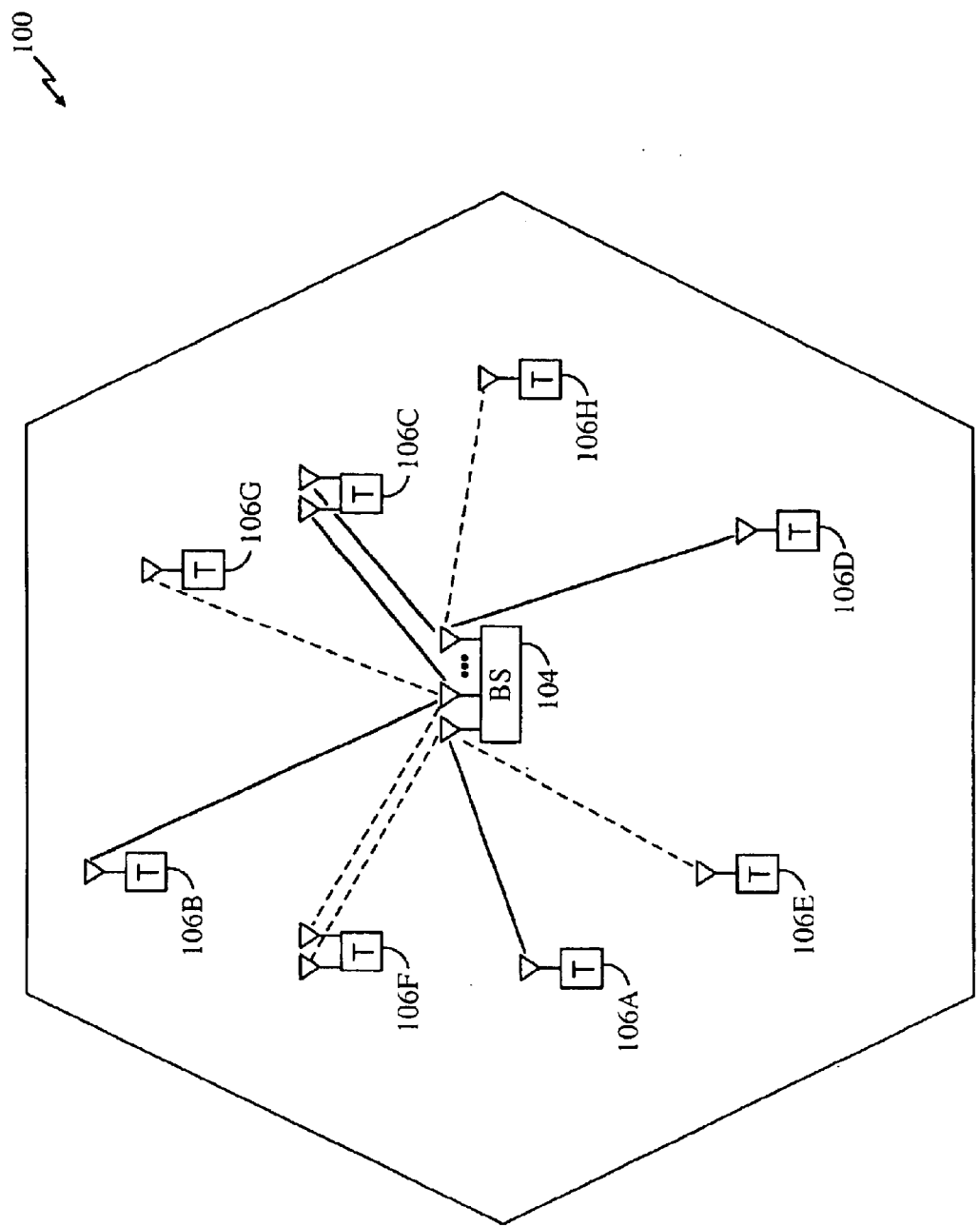
FIG. 1 depicts a diagram of a multiple-input multiple-output (MIMO) communication system in accordance with various aspects of the invention.

FIG. 1 is a diagram of a multiple-input multiple-output (MIMO) communication system 100 for operation in accordance with various aspects and embodiments of the invention. MIMO system 100 employs multiple (NT) transmit antennas and multiple ($N_R$) receive antennas for data transmission. MIMO system 100 is effectively formed for a multiple access communication system having a base station (BS) 104 that concurrently communicates with a number of terminals (T) 106. In this case, base station 104 employs multiple antennas and represents the multiple-input (MI) for downlink transmissions and the multiple-output (MO) for uplink transmissions. The downlink (i.e., forward link) refers to transmissions from the base station to the terminals, and the uplink (i.e., reverse link) refers to transmissions from the terminals to the base station.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min \{N_T, N_R\}$. Each of the $N_C$ independent channels is also referred to as a spatial subchannel of the MIMO channel and corresponds to a dimension. In one common MIMO system implementation, the NT transmit antennas are located at and associated with a single transmitter system, and the $N_R$ receive antennas are similarly located at and associated with a single receiver system. A MIMO system may also be effectively formed for a multiple access communication system having a base station that concurrently communicates with a number of terminals. In this case, the base station is equipped with a number of antennas and each terminal may be equipped with one or more antennas.

An OFDM system effectively partitions the operating frequency band into a number of ($N_F$) frequency subchannels (i.e., frequency bins). At each time slot, a modulation symbol may be transmitted on each of the $N_F$ frequency subchannels. Each time slot corresponds to a particular time interval that may be dependent on the bandwidth of the frequency subchannel.

A multi-channel communication system may be operated to transmit data via a number of transmission channels. For a MIMO system not utilizing OFDM, there is typically only one frequency subchannel and each spatial subchannel may be referred to as a transmission channel. For a MIMO system utilizing OFDM, each spatial subchannel of each frequency subchannel may be referred to as a transmission channel. For an OFDM system not utilizing MIMO, there is only one spatial subchannel for each frequency subchannel and each frequency subchannel may be referred to as a transmission channel.

The transmission channels in a multi-channel communication system typically experience different link conditions (e.g., due to different fading and multipath effects) and may achieve different signal-to-noise-plus-interference ratios (SNRs). Consequently, the capacity of the transmission channels may be different from channel to channel. This capacity may be quantified by the information bit rate (i.e., the number of information bits per modulation symbol) that may be transmitted on a transmission channel for a particular level of performance (e.g., a particular bit error rate (BER) or packet error rate (PER)). Since the link conditions typically vary with time, the supported information bit rates for the transmission channels also vary with time.

To more fully utilize the capacity of the transmission channels, channel state information (CSI) descriptive of the link conditions may be determined (typically at the receiver system) and provided to the transmitter system. The transmitter system may then process (e.g., encode, modulate, and allocate power) data such that the transmitted information bit rate for each channel matches the transmission capacity of the channel. CSI may be categorized as either "full CSI" or "partial CSI". Full CSI includes sufficient characterization (e.g., the amplitude and phase) across the entire system bandwidth for the propagation path between each transmit-receive antenna pair in a $N_R \times N_T$ MIMO matrix (i.e., the characterization for each transmission channel). Partial CSI may include, for example, the SNRs of the transmission channels.

Various techniques may be used to process data prior to transmission over multiple transmission channels. In one technique, data for each transmission channel may be coded, modulated and allocated a power level based on the channel's CSI. By coding, modulating and allocating power separately for each transmission channel, the coding, modulation and the allocated power may be optimized for the SNR achieved by each channel. In one implementation of such a technique, a fixed base code is used to encode data, and the coded bits for each transmission channel are then punctured (i.e., selectively deleted) to obtain a code rate supported by that channel. In this implementation, the modulation scheme for each transmission channel is also selected based on the channel's code rate and SNR. This coding and modulation implementation is described in further detail in U.S. patent application Ser. No. 09/776,075, entitled "CODING SCHEME FOR A WIRELESS COMMUNICATION SYSTEM," filed Feb. 1, 2001, assigned to the assignee of the present application and incorporated by reference herein. For this first technique, substantial implementation complexity is typically associated with having a different code rate and modulation scheme for each transmission channel. Moreover, the power allocation to different channels may involve several iterations since power from one channel is considered as interference for another channel at the receiving antennas. In accordance with various aspects of the invention, techniques are provided to determine the power allocation to different channels in an efficient and effective manner by determining bin energy and total energy at each antenna across all bins.

For a MIMO system utilizing OFDM and having full-CSI available, the transmitter system has knowledge of the complex-valued gain of the transmission path between each transmit-receive antenna pair of each frequency subchannel. This information may be used to render the MIMO channel orthogonal for each frequency subchannel, so that each eigen-mode (i.e., spatial subchannel) of each frequency subchannel may be used for an independent data stream. For a MIMO system utilizing OFDM and having partial-CSI available, the transmitter has limited knowledge of the transmission channels. Independent data streams may be transmitted on corresponding transmission channels over the available transmit antennas, and the receiver system uses a particular linear or non-linear processing technique (i.e., equalization) to separate out the data streams. The equalization provides an independent data stream corresponding to each transmission channel (i.e., each transmit antenna and/or each frequency subchannel), and each of these data streams has an associated SNR.

If the set of SNRs for the transmission channels is available at the transmitter system, this information may be used to select the proper coding and modulation scheme and distribute the total available transmit power. Similar processing may be performed if the channel gains are available at the transmitter system. In an embodiment, a common coding scheme (e.g., a particular Turbo code of a particular code rate) and a common modulation scheme (e.g., a particular QAM constellation) are used for all selected transmission channels.

In a MIMO OFDM system with $N_T$ transmit antennas and $N_R$ receive antennas, the received signals in the n-th frequency bin at the output of the $N_R$ receive antennas may be expressed as:

$$r(n)=H(n)x(n)+z(n); 1\leq n \leq N_F, \quad \text{Eq (1)}$$

where r(n) is the received symbol vector (i.e., the $N_R \times 1$ vector output from the MIMO channel, as derived from the receive antennas) in the n-th OFDM frequency bin; H(n) is the $N_R \times N_T$ complex-valued channel coefficient matrix, representing the channel response at the frequency associated with the n-th OFDM frequency bin; x(n) is the transmitted symbol vector in the n-th OFDM frequency bin (i.e., the $N_T \times 1$ vector input into the MIMO channel); and z(n) is an $N_R \times 1$ vector representing noise plus interference in the n-th OFDM frequency bin. The received symbol vector r(n) includes $N_R$ modulation symbols associated with OFDM frequency bin n, from $N_R$ signals received via $N_R$ receive antennas at a specific time slot. Similarly, the transmitted symbol vector x(n) includes $N_T$ modulation symbols associated with OFDM frequency bin n, in $N_T$ signals transmitted via $N_T$ transmit antennas at a specific time slot.

The channel coefficient matrix H(n) can be further written as:

$$H(n)=[h_1(n) h_2(n) \ldots h_{N_T}(n)] \quad \text{Eq (2)}$$

where the vectors $h_i(n)$ contain the channel coefficients associated with the i-th transmit antenna at the frequency associated with the n-th OFDM frequency bin.

The transmission channels in a multi-channel communication system typically experience different link conditions and achieve different SNRs. Some channel conditions associated with increased channel attenuation result in lower received SNRs, while other channel conditions associated with decreased channel attenuation result in higher received SNRs. It is well-known in information theory that, in multi-channel communication systems with limited available transmit power, capacity is maximized by distributing the available power among the channels using a procedure known as water-pouring as described by [1] Robert G. Gallager, in *Information Theory and Reliable Communication*, published by John Wiley and Sons, Inc., 1968, incorporated by reference herein, and hereinafter known as [1]. In MIMO OFDM communication systems, where the transmitter has full CSI, the transmitter is capable of performing beam forming across the set of transmit antennas, and there is a limit on total combined transmit power from all transmit antennas, the capacity can be maximized by allocating the total transmit power amongst all of the spatial subchannels of all of the frequency subchannels according to the water-pouring procedure in [1]. This procedure, when applied to a single frequency in a MIMO system, is described, for example, by [2] I. Emre Telatar, in "Capacity of Multi-antenna Gaussian Channels," European Transactions on Telecommunications, vol. 10, pp 585–595, Nov/Dec, 1999, incorporated by reference herein, and hereinafter known as [2]. In a publication [3] by Daniel Perez Palomar, Javier R. Fonollosa, Miguel A. Lagunas, "Capacity results on frequency-selective Rayleigh MIMO channels," IST Mobile Comm SUMMIT 2000, pp 491–496, Galway, Ireland, Oct. 1–4, 2000, incorporated by reference herein, and hereinafter known as [3], water-pouring across frequencies and eigen-modes in a MIMO system are described.

However, in MIMO OFDM communication systems where there are per-antenna transmit power limitations, or it is not possible to perform beam forming across the set of transmit antennas, it is necessary to find an optimal allocation of available transmit power across the frequency subchannels at each transmit antenna, since in these cases it is not possible to directly control the allocation of transmit power to eigen-modes. In these cases, the water-pouring solution described in [1] cannot be used because of the coupling between the MIMO spatial subchannels on each frequency subchannel when eigen-mode decomposition is not available to render the frequency subchannels orthogonal.

Figure 2:
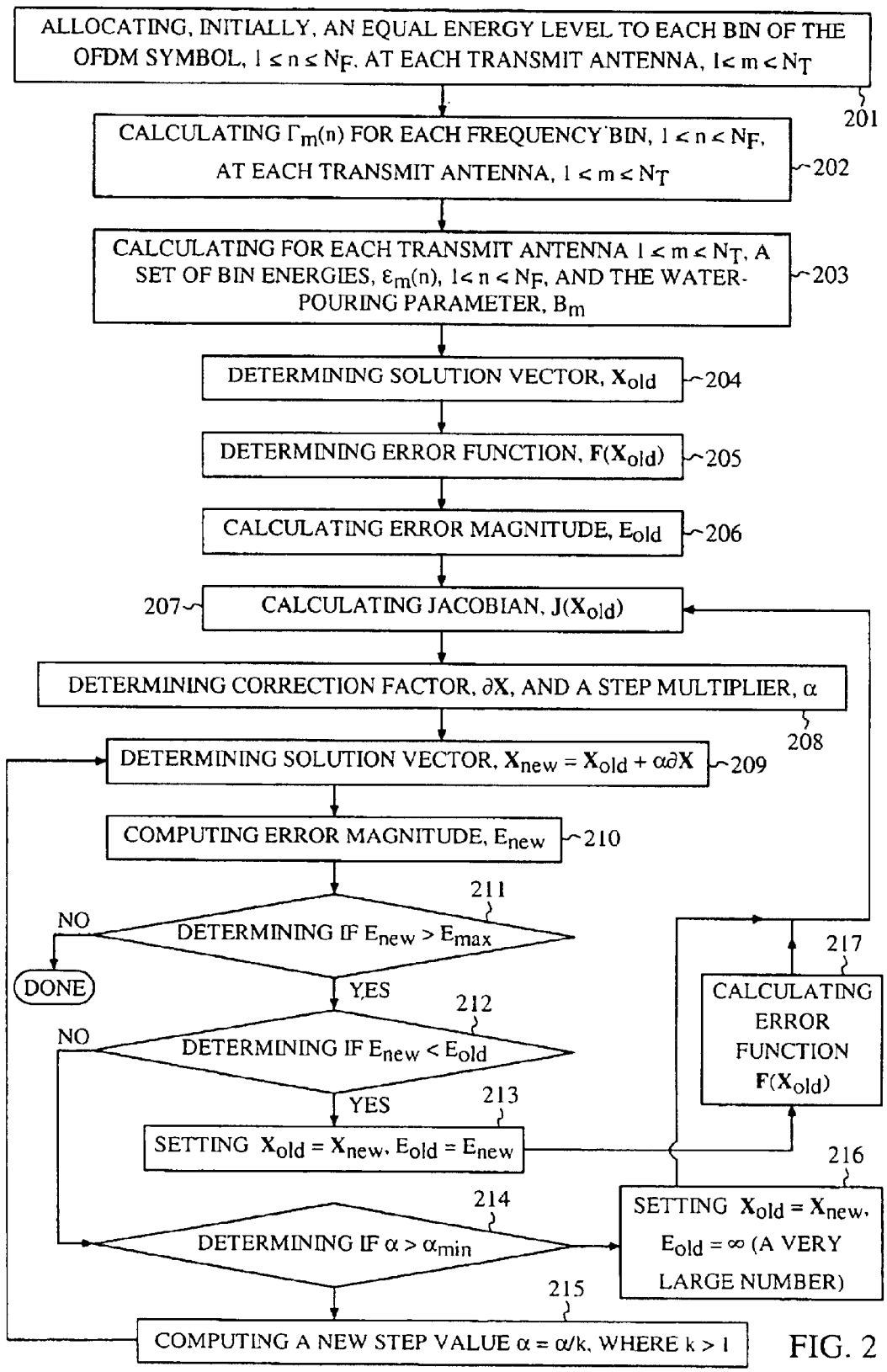
FIG. 2 depicts a flow diagram of a process for determining the amount of transmit power to be allocated to each selected transmission channel in accordance with various embodiments of the invention.

FIG. 2 depicts a flow diagram of a process 200 to determine the allocation bin energy level to each OFDM frequency bin at each antenna and total energy across all bins and antennas in accordance with various embodiments of the invention. The OFDM frequency bins may range from 1 to $N_F$ ($1 \leq n \leq N_F$). The number of transmit antennas may range from 1 to any number $N_T$ ($1 \leq m \leq N_T$). The objective of the procedure is to compute values of the bin energies, $\epsilon_m(n); 1 \leq m \leq N_T; 1 \leq n \leq N_F$, and water-pouring parameters $B_m; 1 \leq m \leq N_T$, which satisfy the water-pouring equations:

$$\max\left[\left(B_m - \frac{1}{\Gamma_m(n)}\right), 0\right] - \epsilon_m(n) = 0; \quad \text{Eq (3)}$$

$$1 \leq m \leq N_T; 1 \leq n \leq N_F$$

$$\sum_{n=1}^{N_F} \epsilon_m(n) - E_m = 0; 1 \leq m \leq N_T$$

where $E_m$ is the maximum energy available for transmission of a single OFDM symbol at antenna m, and $\Gamma_m(n)$ is defined by the following:

$$\Gamma_m(n) = \underline{h}_m^H(n) \left[ N_0 \underline{I} + \sum_{\substack{l=1 \\ l \neq m}}^{n_{Lx}} \epsilon_m(n) \underline{h}_l(n) \underline{h}_l^H(n) \right]^{-1} \underline{h}_m(n) \quad \text{Eq (4)}$$

In the following description of the iterative procedure for finding values of the bin energies, $\epsilon_m(n)$; $1 \leq m \leq N_T; 1 \leq n \leq N_F$, and water-pouring parameters $B_m; 1 \leq m \leq N_T$, which satisfy the water-pouring equations in Eq (3), the following $N_T(N_F+1) \times 1$ vector, x, is defined with elements:

$$x_{(m-1)(N_F+1)+n} = \epsilon_m(n); 1 \leq m \leq N_T; 1 \leq n \leq N_F$$

$$x_{m(N_F+1)} = B_m; 1 \leq m \leq N_T \quad \text{Eq (5)}$$

and the following $N_T(N_F+1) \times 1$ vector function, F(x), is defined with elements:

$$F_{(m-1)(N_F+1)+n}(\underline{x}) = \max\left[\left(x_{m(N_F+1)} - \frac{1}{\Gamma_m(n)}\right), 0\right] - \quad \text{Eq (6)}$$

$$x_{(m-1)(N_F+1)+n}; 1 \leq m \leq N_T;$$

$$1 \leq n \leq N_F$$

$$F_{m(N_F+1)}(\underline{x}) = \sum_{n=1}^{N_F} x_{(m-1)(N_F+1)+n} - E_m; 1 \leq m \leq N_T$$

The solution vector, x, is the vector whose values satisfy F(x)=0, where 0 is a $N_T(N_F+1) \times 1$ vector of zeros.

In process 200, steps 201 through 206 establish an initial guess at the solution vector. Subsequent steps, 207 through 217, are iterated until a solution vector is reached such that the error is smaller than some specified error criterion: $\|F(x)\|^2 < E_{max}$. These steps are a method of applying the Newton-Raphson method for solving non-linear equations to the solution of the present problem. A reference [4] by William H. Press, Saul A. Teukolsky, William T. Vetterling, Brian T. Flannery, *Numerical Recipes in C: The Art of Scientific Computing*, Cambridge University Press, 1992, incorporated by reference herein, and hereinafter known as [4], may be helpful for understanding of Newton-Raphson. This solution also requires calculation of the Jacobian, $J(x)$, of $F(x)$, which is a matrix of partial derivatives of $F(x)$ with respect to the elements of x. The elements of the Jacobian matrix $J(x)$ are given in the following:

$$\frac{\partial F_{(m-1)(N_F+1)+n}(\underline{x})}{\partial x_{(i-1)(N_F+1)+j}} = 0; 1 \leq j \neq n \leq N_F; 1 \leq m, i \leq N_T \quad \text{Eq (7)}$$

$$\frac{\partial F_{m(N_F+1)}(\underline{x})}{\partial x_{(m-1)(N_F+1)+j}} = 1; 1 \leq j \leq N_F; 1 \leq m \leq N_T$$

$$\frac{\partial F_{(m-1)(N_F+1)+n}(\underline{x})}{\partial x_{m(N_F+1)}} = \begin{cases} 1; x_{m(N_F+1)} - \frac{1}{\Gamma_m(n)} > 0 \\ 0; x_{m(N_F+1)} - \frac{1}{\Gamma_m(n)} \leq 0; 1 \leq n \leq N_F; \\ 1 \leq m \leq N_T \end{cases}$$

$$\frac{\partial F_{m(N_F+1)}(\underline{x})}{\partial x_{m(N_F+1)}} = 0; 1 \leq m \leq N_T$$

$$\frac{\partial F_{(m-1)(N_F+1)+n}(\underline{x})}{\partial x_{(m-1)(N_F+1)+n}} = -1; 1 \leq n \leq N_F; 1 \leq m \leq N_T$$

$$\frac{\partial F_{(m-1)(N_F+1)+n}(\underline{x})}{\partial x_{(i-1)(N_F-1)+n}} = \begin{cases} -\frac{\partial}{\partial x_{(i-1)(N_F+1)+n}}\left(\frac{1}{\Gamma_m(n)}\right); & x_{m(N_F+1)} - \frac{1}{\Gamma_m(n)} > 0 \\ 0; & x_{m(N_F+1)} - \frac{1}{\Gamma_m(n)} \leq 0 \\ & 1 \leq i \neq m \leq N_T; \\ & 1 \leq m \leq N_F \end{cases}$$

where $$\frac{\partial}{\partial x_{(i-1)(N_F+1)+n}}\left(\frac{1}{\Gamma_m(n)}\right) = \quad \text{Eq (8)}$$

$$\frac{\left|\underline{h}_m^H(n)\left[N_0 I + \sum x_{(i-1)(N_F+1)+n}\underline{h}_i(n)\underline{h}_i^H(n)\right]^{-1}\underline{h}_i(n)\right|^2}{(\Gamma_m(n))^2}$$

At step 201, initially, an equal energy level is allocated to each bin of the OFDM frequency bins at each transmit antenna, i.e., $$\varepsilon_m(n) = \frac{E_m}{N_F}; 1 \leq m \leq N_T; 1 \leq n \leq N_F.$$

At step 202, signal to noise ratio of each OFDM frequency bin n, $1 \leq n \leq N_F$ at each antenna m, $1 \leq m \leq N_T$, represented by $\Gamma_m(n)$, is calculated in accordance with Eq (4), using the values of $\epsilon_m(n)$ calculated in step 201.

Figure 3:
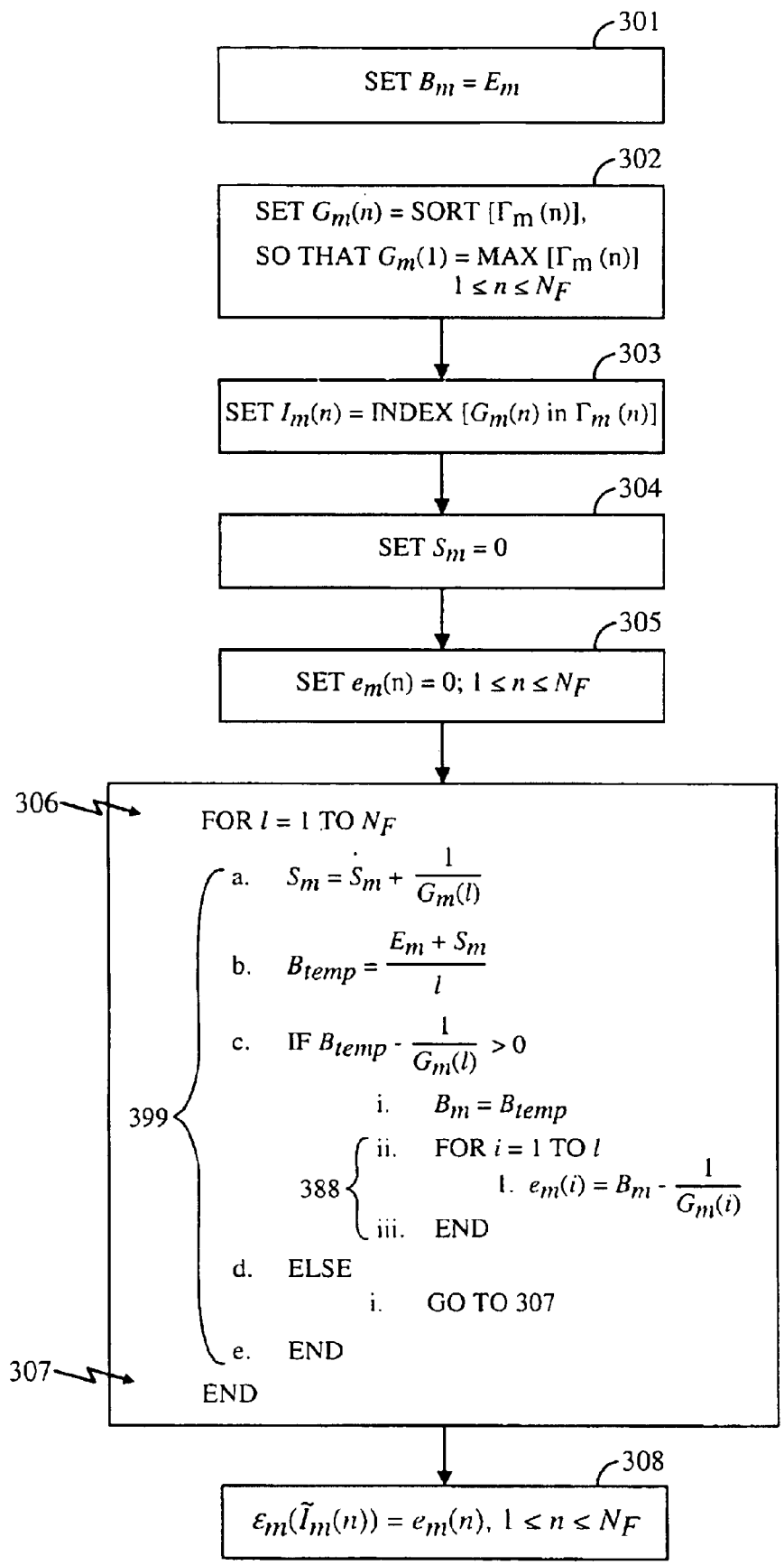
FIG. 3 depicts a flow diagram for calculating solution vector of the "water- pouring" equation for one or more steps of flow diagram shown in FIG. 2 in accordance with various aspects of the invention.

At step 203, a set of bin energies, $\epsilon_m(n)$ for each transmit antenna m; $1 \leq m \leq N_T$, and OFDM frequency bin, n; $1 \leq n \leq N_F$, and the water-pouring parameter, $B_m$, for each transmit antenna, m; $1 \leq m \leq N_T$, are calculated, to satisfy the water-pouring equations given in Eq (3) using the values of $\Gamma_m(n)$ calculated in step 202. The values of $B_m$ and $\epsilon_m(n)$ may be calculated in accordance with a process depicted in FIG. 3.

At step 204, an initial solution vector, $x_{old}$, is calculated in accordance with the relationship described in Eq (5), using the values of $B_m$ and $\epsilon_m(n)$ calculated in step 203.

At step 205, an error function $F(x_{old})$ is calculated in accordance with the relationship described in Eq (6), using the initial solution vector, $x_{old}$, calculated in step 204.

At step 206, an error magnitude $E_{old}$ is calculated. The error magnitude $E_{old}$ may be equal to the square of the magnitude of the error function $F(x_{old})$: $E_{old} = \|F(x_{old})\|^2$. At step 207, the Jacobian, $J(x_{old})$, is calculated in accordance with the relationship described in Eq (7) and Eq (8). The Jacobian of a nonlinear function may be used to solve a system of nonlinear equations in a large matrix. At step 208, a correction vector $\partial x$ and a step multiplier $\alpha$ may be determined. The correction vector is computed by solving the equation $\partial x = -(J(x_{old}))^{-1}F(x_{old})$ for the correction vector $\partial x$. The value of the step multiplier, $\alpha$, may be determined in such a way as to ensure that the error magnitude, $E_{new}$, associated with the update of the solution vector is smaller than $E_{old}$.

One way of determining the value of the step multiplier is $$\alpha = \min\left(1, \frac{1}{\max(|\partial x|)}\right),$$

where max $(|\partial x|)$ is the magnitude of the element of $\partial x$ with the largest magnitude.

At step 209, a new solution vector $x_{new}$ is calculated based on the old solution vector $x_{old}$ and the correction factor $\partial x$ and the step multiplier $\alpha$. The new solution vector $x_{new}$ may be calculated according to $x_{new} = x_{old} + \alpha \partial x$. At step 210, a new error magnitude $E_{new}$ is calculated based on the new solution vector $x_{new}$. At step 211, $E_{new}$ is compared to a maximum error magnitude, $E_{max}$, allowed for the system. The value for $E_{max}$ may be pre-selected. If at step 211, the value of $E_{new}$ is less than the $E_{max}$, the solution vector $x_{new}$ holds acceptable values for set of bin energies, $\epsilon_m(n)$; $1 \leq m \leq N_T; 1 \leq n \leq N_F$, and water-pouring parameters $B_m; 1 \leq m \leq N_T$. If the value of $E_{new}$ is more than the allowable $E_{max}$, the calculated values are erroneous to an unacceptable degree.

At step 212, the value of $E_{new}$ is compared to the value of $E_{old}$. If the value of $E_{new}$ is less than the value of $E_{old}$, at step 213, the old solution vector $x_{old}$ is set to equal the new solution vector $x_{new}$, and the value of $E_{old}$ is set equal to the value of $E_{new}$. At step 217, the value for the error function $F(x_{old})$ is calculated based on the value of solution vector $x_{old}$ determined at step 213. From step 217, the process loops back to step 207. At step 207, after looping back from step 217, Jacobian of $x_{old}$ is determined based on the value of $F(x_{old})$ determined at step 217.

At step 212, if the value of $E_{new}$ is more than the value of $E_{old}$, the process loops to step 214. At step 214, the value of step multiplier a is compared to a minimum value of the step multiplier $\alpha_{min}$. If the step multiplier a is greater than the minimum value, at step 215, a new value for step multiplier α is determined. The new value in accordance with an embodiment is less than the old value by a factor "k" greater than one. The process loops back to step 209 to calculate a new $x_{new}$ based on the new step multiplier α. At step 214, if the step multiplier α is less than the minimum value, the value of $x_{new}$ is set for the value of $x_{old}$, and a large value is set for $E_{old}$ at step 216. From step 216, the process loops back to step 207. The process may be repeated many times until the error magnitude is less than a maximum error magnitude at step 211. The last value of the solution vector $x_{new}$ holds the set of bin energies, $\epsilon_m(n)$; $1 \leq m \leq N_T$; $1 \leq n \leq N_F$, and the water-pouring parameters $B_m$; $1 \leq m \leq N_T$.

The initial guess for the values of the bin energies, $\epsilon_m(n)$; $1 \leq m \leq N_T$; $1 \leq n \leq N_F$, and the water-pouring parameters, $B_m$; $1 \leq m \leq N_T$, calculated in step 203 may be calculated in accordance with a process depicted in flow chart 300 shown in FIG. 3. This process is repeated once for each transmit antenna m, $1 \leq m \leq N_T$. The total energy, $E_m$, available for an OFDM symbol at a transmit antenna m is known. Each OFDM symbol may have a number $N_F$ of frequency bins. At step 301, the value of $B_m$ is initially set equal to the value of the total energy, $E_m$, available at each antenna. At step 302, a vector $G_m(n), 1 \leq n \leq N_F$ is created from the values of $\Gamma_m(n), 1 \leq n \leq N_F$ calculated in step 202 of process 200, by sorting them in order of descending magnitude. The first value, $G_m(1)$, of vector $G_m(n), 1 \leq n \leq N_F$ holds the largest value of $\Gamma_m(n), 1 \leq n \leq N_F$, and the last value, $G_m(N_F)$, of vector $G_m(n), 1 \leq n \leq N_F$ holds the smallest value of $\Gamma_m(n)$, $1 \leq n \leq N_F$. At step 303, an index vector, $I_m(n)$, may be defined to cross reference common elements between the vectors $G_m(n), 1 \leq n \leq N_F$) and $\Gamma_m(n), 1 \leq n \leq N_F$ such that $\Gamma_m(I_m(n)) = G_m(n)$. At step 304, a variable $S_m$, associated with an antenna m, $m, 1 \leq m \leq N_T$, is set to zero. At step 305, the elements of the sorted bin energy vector $e_m(n), 1 \leq n \leq N_F$ are set to zero for OFDM frequency bin $n, 1 \leq n \leq N_F$. An iterative loop 399 may begin at step 306 and end at step 307. Iterative loop 399 runs for a variable l from 1 to $N_F$. At step 399a $S_m$ is updated according to $$S_m = S_m + \frac{1}{G_m(l)}.$$

At step 399b, a variable $B_{temp}$ is set according to $$B_{temp} = \frac{E_m + S_m}{l}.$$

At step 399c, if $$B_{temp} - \frac{1}{G_m(l)}$$

is greater than zero, $B_m$ is set to $B_{temp}$ at step 399ci. At step 399cii, a loop 388 begins for all values i=1 to l. At step 388-1, $e_m(i)$ is set according to $$e_m(i) = B_m - \frac{1}{G_m(i)}.$$

The loop 388 ends at step 399ciii. At step 399c, if $$B_{temp} - \frac{1}{G_m(l)}$$

is less than or equal to zero, then iterative loop 399 ends. Once the process is completed at step 307, the initial guess for the bin energies, $\epsilon_m(i)$, are set according to $\epsilon_m(I_m(n)) = e_m(n), 1 \leq n \leq N_F$ for all OFDM frequency bins $n, 1 \leq n \leq N_F$. The values determined for $B_m$ and $\epsilon_m(n), 1 \leq n \leq N_F$ in this process are used in the process flow 200 at step 203.

Figure 4:
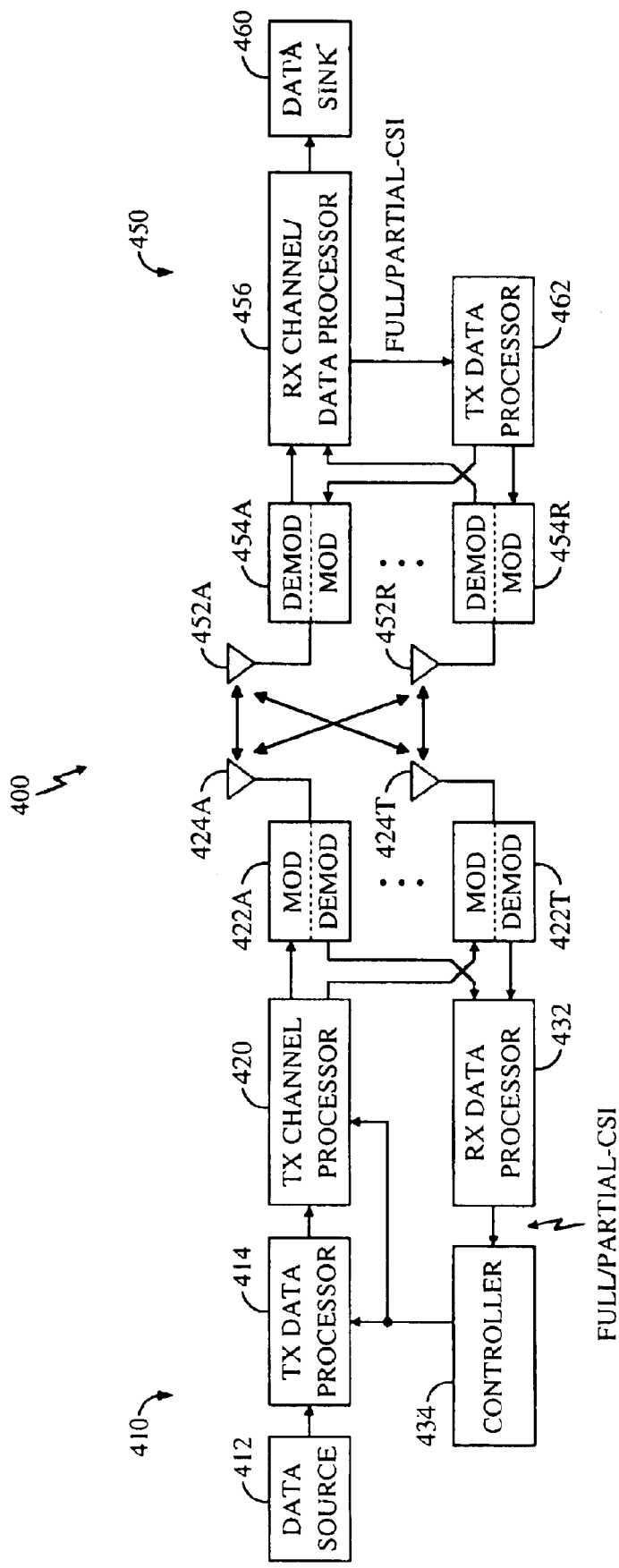
FIG. 4 is a diagram of a MIMO communication system capable of implementing various aspects and embodiments of the invention.

FIG. 4 is a diagram of a MIMO communication system 400 capable of operating in accordance with various aspects and embodiments of the invention. System 400 includes a first system 410 (e.g., base station 104 in FIG. 1) in communication with a second system 450 (e.g., terminal 106). System 400 may be operated to employ a combination of antenna, frequency, and temporal diversity to increase spectral efficiency, improve performance and enhance flexibility. At system 410, a data source 412 provides data (i.e., information bits) to a transmit (TX) data processor 414, which (1) encodes the data in accordance with a particular encoding scheme, (2) interleaves (i.e., reorders) the encoded data based on a particular interleaving scheme, and (3) maps the interleaved bits into modulation symbols for one or more transmission channels selected for data transmission. The encoding increases the reliability of the data transmission. The interleaving provides time diversity for the coded bits, permits the data to be transmitted based on an average SNR for the selected transmission channels, combats fading, and further removes correlation between coded bits used to form each modulation symbol. The interleaving may further provide frequency diversity if the coded bits are transmitted over multiple frequency subchannels. In an aspect, the coding, and symbol mapping may be performed based on control signals provided by a controller 434. A TX channel processor 420 allocates the power level for each selected transmission channel, and provides a stream of modulation symbols for each transmission channel, one modulation symbol per time slot. The allocated transmit power for each selected transmission channel is to achieve a desired SNR at the receiver system. In an aspect, the power allocation may be performed based on control signals provided by a controller 434. The set of bin energies, $\epsilon_m(n)$; $1 \leq m \leq N_T$; $1 \leq n \leq N_F$, and the total energy at each antenna across all bins, $E_m$, are basis for the channel power allocation. The modulator 422 modulates each signal for transmission from an antenna.

At a receiver system 450, a number of receive antennas 452 receive the transmitted signals and provide the received signals to respective demodulators (DEMOD) 454. Each demodulator 454 performs processing complementary to that performed at modulator 422. The modulation symbols from all demodulators 454 are provided to a receive (RX) channel/data processor 456 and processed to recover the transmitted data streams. RX channel/data processor 456 performs processing complementary to that performed by TX data processor 414 and TX channel processor 420 and provides decoded data to a data sink 460.

At system 410, the transmitted feedback signal is received by antennas 424, demodulated by demodulators 422, and provided to a RX data processor 432. RX data processor 432 performs processing complementary to that performed by TX data processor 462 and recovers the reported CSI, which is then provided to controller 434.

Controller 434 uses the reported CSI to perform a number of functions including (1) selecting the set of $N_S$ best available transmission channels for data transmission, (2) determining the coding and modulation scheme to be used for data transmission on the selected transmission channels, and (3) determining the allocation of power for the selected transmission channels. The characteristics (e.g., channel gains or received SNRs) of the transmission channels available for data transmission may be determined based on various techniques as described and provided to the transmitter system.

The techniques described herein may be used for data transmission on the downlink from a base station to one or more terminals, and may also be used for data transmission on the uplink from each of one or more terminals to a base station. For the downlink, transmitter system 410 may represent part of a base station and receiver system 450 may represent part of a terminal. For the uplink, transmitter system 410 may represent part of a terminal and receiver system 450 may represent part of a base station.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor. Certain aspects of the invention may also be implemented with a combination of software and hardware.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communication in a multiple-input multiple-output (MIMO) wireless system, comprising:

receiving a plurality of signals at a receiver via a plurality of receive antennas, wherein each of the received signals at each of the plurality of receive antennas comprises a combination of one or more signals transmitted from a transmitter, processing the plurality of received signals to derive channel state information (CSI) indicative of characteristics of a plurality of transmission channels between the receiver and the transmitter;

transmitting the CSI to the transmitter, wherein the transmitter calculates frequency bin energies for a plurality of frequency bins on a plurality of transmit antennas at the transmitter according to a limited power available at each transmit antenna and in accordance with water-pouring equations based in part on the CSI and using an iterative method, and further wherein the transmitter conditions modulation symbols in accordance with the calculated frequency bin energies.

2. The method as recited in claim 1 wherein the frequency bin energies are calculated by solving sets of non-linear equations while maintaining a measure of error at an acceptable level.

3. In a MIMO communication system with limited power for each transmit antenna, a method for determining bin energy level allocation to each OFDM frequency bin at each transmit antenna, comprising:

determining an estimate of a solution vector including elements of said allocation bin energy level to each OFDM frequency bin at each antenna;

determining an error function based on said determined solution vector;

determining an error magnitude based on said determined error function;

comparing said error magnitude to an error threshold; and accepting said estimate of said solution vector with said elements of said allocation bin energy level when said error magnitude is less than said error threshold.

4. The method as recited in claim 3 further comprising:

continuing, in an iterative manner, said determining said estimate of said solution vector, said determining said error function and said error magnitude and said comparing said error magnitude to said error threshold until said error magnitude is less than said error threshold.

5. The method as recited in claim 3 wherein said determining said estimate of said solution vector including:

allocating initially an equal energy level to each bin of the OFDM frequency bins at each transmit antenna;

calculating signal to noise ratio in each of said frequency bins at each of said antennas ($\Gamma_m(n)$ for each transmit antenna and OFDM frequency bin and based on said allocated equal energy level to each bin;

determining bin energy level and a water pouring parameter at each antenna based on said calculated $\Gamma_m(n)$ while satisfying a set of water-pouring equations; and wherein said determined said estimate of said solution vector is based on said determined energy level of each bin and said water pouring parameter.

6. The method as recited in claim 5 wherein said iterative manner includes correcting said determined solution vector based on a correction vector and a step multiplier.

7. The method as recited in claim 6 wherein said correction vector is based on Jacobian of said determined solution vector and said error function.

8. The method as recited in claim 6 wherein said correction vector is adjusted to determine a new solution vector in each iterative step.

9. The method as recited in claim 8 further comprising the step of determining a new error magnitude after each iterative step and comparing the new error magnitude to said error threshold.

10. In a MIMO communication system with limited power for each antenna, an apparatus for determining bin energy level allocation to each OFDM frequency bin at each transmit antenna, comprising:

means for determining an estimate of a solution vector including elements of said allocation bin energy level to each OFDM frequency bin at each antenna;

means for determining an error function based on said determined solution vector;

means for determining an error magnitude based on said determined error function;

means for comparing said error magnitude to an error threshold; and means for accepting said estimate of said solution vector with said elements of said allocation bin energy level when said error magnitude is less than said error threshold.

11. The apparatus as recited in claim 10 further comprising:

means for continuing, in an iterative manner, said determining said estimate of said solution vector, said determining said error function and said error magnitude and said comparing said error magnitude to said error threshold until said error magnitude is less than said error threshold.

12. The apparatus as recited in claim 10 wherein said means for determining said estimate of said solution vector including:

means for allocating initially an equal energy level to each bin of the OFDM frequency bins at each transmit antenna;

means for calculating signal to noise ratio $\Gamma_m(n)$ for each transmit antenna and OFDM frequency bin and based on said allocated equal energy level to each bin;

means for determining bin energy level and a water pouring parameter at each antenna based on said calculated $\Gamma_m(n)$ while satisfying a set of water-pouring equations; and wherein said determined said estimate of said solution vector is based on said determined energy level of each bin and said water pouring parameter.

13. The apparatus as recited in claim 11 wherein said iterative manner includes correcting said determined solution vector based on a correction vector and a step multiplier.

14. The apparatus as recited in claim 13 wherein said correction factor is based on Jacobian of said determined solution vector and said error function.

15. The apparatus as recited in claim 11 wherein said correction vector is adjusted to determine a new solution vector in each iterative step.

16. The apparatus as recited in claim 15 further comprising means for determining a new error magnitude after each iterative step and comparing the new error magnitude to said error threshold.

17. A processor configured for use in a MIMO communication system with limited power for each antenna, the processor for determining bin energy level allocation to each OFDM frequency bin at each transmit antenna, comprising:

a transmit channel processor for coupling to a transmitter in said communication system;

wherein said transmit channel processor is configured for:

determining an estimate of a solution vector including elements of said allocation bin energy level to each OFDM frequency bin at each antenna of said transmitter;

determining an error function based on said determined solution vector;

determining an error magnitude based on said determined error function;

comparing said error magnitude to an error threshold; and accepting said estimate of said solution vector with said elements of said allocation bin energy level when said error magnitude is less than said error threshold.

18. The processor as recited in claim 17 wherein said transmit channel processor further configured for continuing, in an iterative manner, said determining said estimate of said solution vector, said determining said error function and said error magnitude and said comparing said error magnitude to said error threshold until said error magnitude is less than said error threshold.

19. The processor as recited in claim 17 wherein said determining said estimate of said solution vector including:

allocating initially an equal energy level to each bin of the OFDM frequency bins at each transmit antenna;

calculating signal to noise ratio $\Gamma_m(n)$ for each transmit antenna and OFDM frequency bin and based on said allocated equal energy level to each bin;

determining bin energy level and a water pouring parameter at each antenna based on said calculated $\Gamma_m(n)$ while satisfying a set of water-pouring equations; and wherein said determined said estimate of said solution vector is based on said determined energy level of each bin and said water pouring parameter.

20. The processor as recited in claim 17 wherein said iterative manner includes correcting said determined solution vector based on a correction vector and a step multiplier.

21. The processor as recited in claim 20 wherein said correction vector is based on Jacobian of said determined solution vector and said error function.

22. The processor as recited in claim 20 wherein said correction vector is adjusted to determine a new solution vector in each iterative step.

23. The processor as recited in claim 22 further comprising the step of determining a new error magnitude after each iterative step and comparing the new error magnitude to said error threshold.

* * * * *